United States Patent [19]
Boillat et al.

[11] Patent Number: 5,767,651
[45] Date of Patent: Jun. 16, 1998

[54] DEVICE FOR DRIVING A POSITIONING ELEMENT BY MEANS OF A STEPPING MOTOR

[75] Inventors: Pierre Boillat, Meyriez, Switzerland; Dieter Heinle, Pluederhausen, Germany; Wolfgang Straub, Deggingen, Germany; Juergen Blessing, Bad Wildbad, Germany

[73] Assignees: Mercedes-Benz AG, Stuttgart, Germany; SAIA AG, Murten, Switzerland

[21] Appl. No.: 625,258

[22] Filed: Apr. 1, 1996

[30] Foreign Application Priority Data

Mar. 31, 1995 [DE] Germany ............ 195 11 865.0

[51] Int. Cl.$^6$ ........................................ H02P 8/00
[52] U.S. Cl. ............ 318/696; 318/685; 318/701; 318/254; 318/138; 318/439
[58] Field of Search ............... 318/665, 696, 318/701, 254, 138, 439

[56] References Cited

U.S. PATENT DOCUMENTS

| | | |
|---|---|---|
| 4,262,240 | 4/1981 | Arai . |
| 4,491,424 | 1/1985 | Ito et al. ............... 318/696 X |
| 4,947,097 | 8/1990 | Tao . |
| 5,194,787 | 3/1993 | Antognini . |
| 5,378,975 | 1/1995 | Schweid et al. . |
| 5,592,057 | 1/1997 | Kordik ............... 318/696 X |

FOREIGN PATENT DOCUMENTS

| | | |
|---|---|---|
| 0 207 295 | 1/1987 | European Pat. Off. . |
| 0 433 219 | 6/1991 | European Pat. Off. . |
| 1 303 612 | 5/1972 | Germany . |
| 29 25 216 | 4/1985 | Germany . |
| 29 08 182 | 9/1985 | Germany . |
| 28 05 363 | 4/1988 | Germany . |
| 2-60497 | 2/1990 | Japan . |
| 5-207799 | 8/1993 | Japan . |
| WO 91/07811 | 5/1991 | WIPO . |

OTHER PUBLICATIONS

*Electronic Design*, 43 (1995) Aug. 7, No. 16, entitled "Read Back-EMF At Low Motor Speeds" by John Parry et al., p. 87.

"Closed-Loop Control of a 3.6' Floppy-Disk Drive PM Motor by Back-EF Sensing" by B. C. Kuo, Dept. of Electrical Engineering, Univ. of Illinois at Champaign Urbana, and K. Butts, General Motors Corporation, Warren, MI.

*Primary Examiner*—Karen Masih
*Attorney, Agent, or Firm*—Evenson, McKeown, Edwards & Lenahan, P.L.L.C.

[57] ABSTRACT

A device for driving a positioning element via a stepping motor is described. This device makes it possible to continue operating the stepping motor in conjunction with its use as an encoder during phases without electrical control, so that the position last reached under electrical control, with a zero-current change in the position, possibly as a result of manual operation of the positioning element that is rotationally or frictionally coupled with the motor rotor, is constantly updated so that the control electronics is informed at all times of the actual position from which the stepping motor is to be controlled electrically to assume a new position. The device not only permits eliminating indexing devices that are subject to wear, but also allows automatic return, for example of a positioning element to its previous starting position after it has been shifted or adjusted from by an outside influence. The device is usable in conjunction with an operating or adjusting element in a vehicle and in this regard is especially advantageously usable in conjunction with an adjusting element that functions as a manual operating element of the heating or air conditioning system.

13 Claims, 1 Drawing Sheet

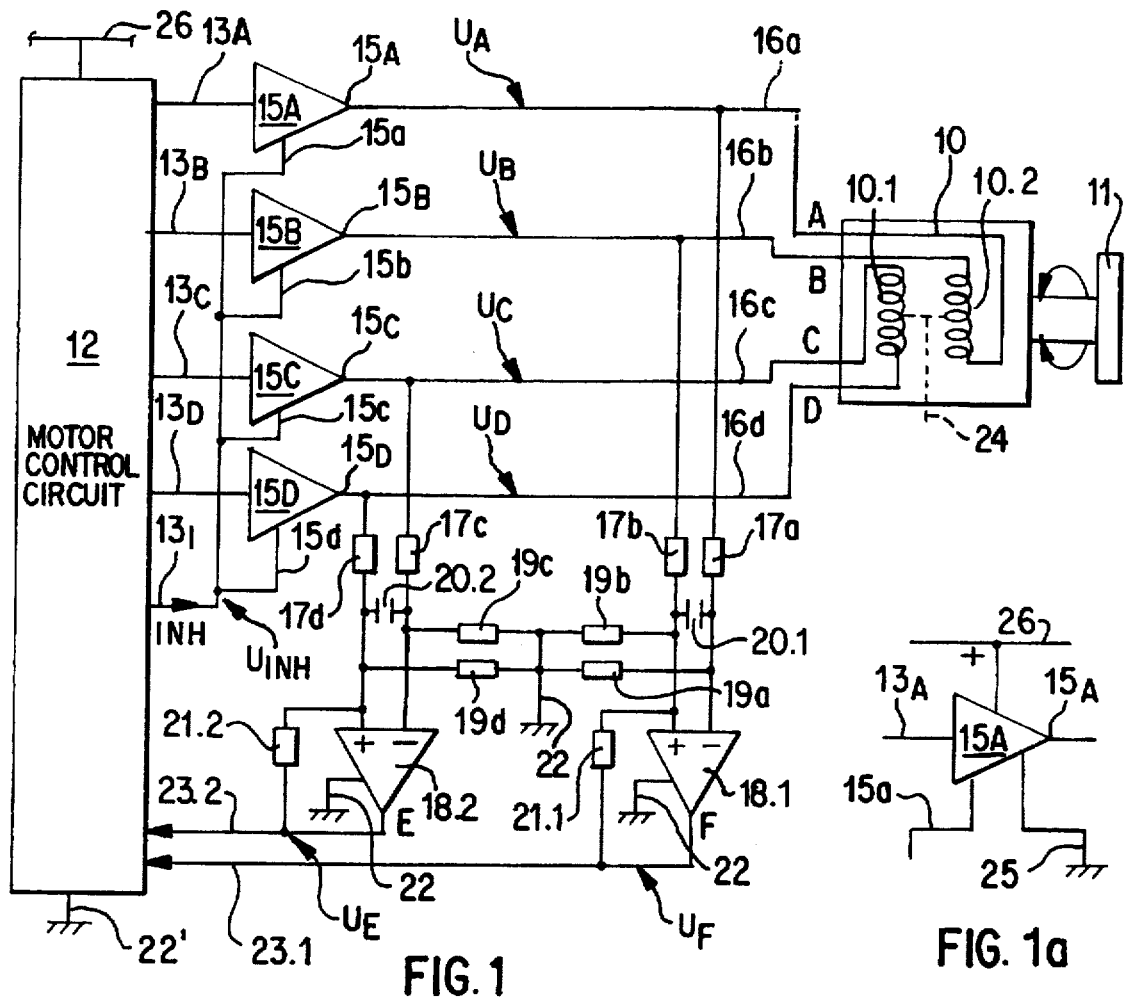
FIG. 1
FIG. 1a
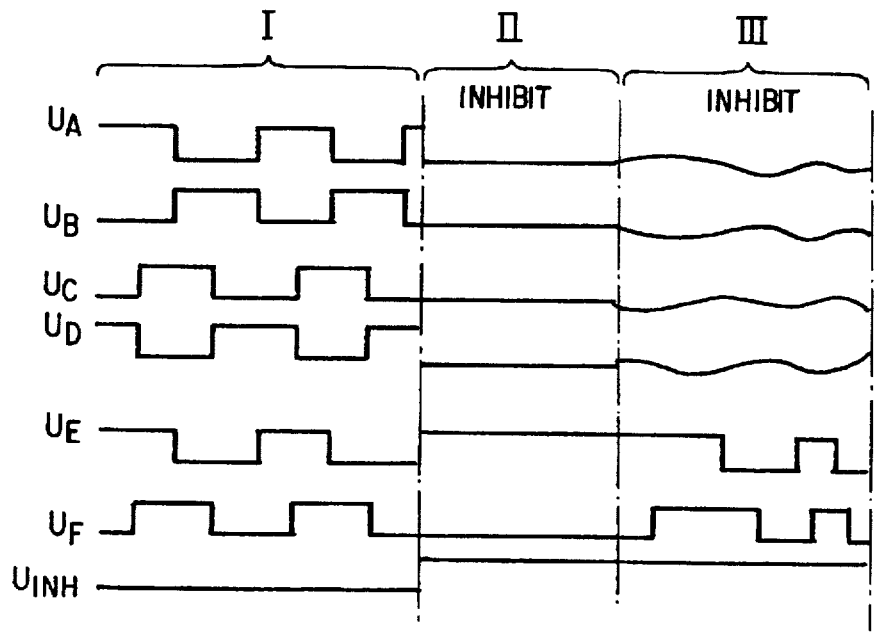
FIG. 2

DEVICE FOR DRIVING A POSITIONING ELEMENT BY MEANS OF A STEPPING MOTOR

BACKGROUND AND SUMMARY OF THE INVENTION

The invention relates to a device for driving a positioning element via a stepping motor and, more particularly, to a device for driving a positioning element via a stepping motor whose rotor is rotationally and/or frictionally connected with the positioning element. The positioning element, including the rotor, is adjustable, even without electrical control of the stepping motor, by the action of an external force or moment. A control circuit generates driving pulses for the motor windings.

A device for driving the positioning element via a stepping motor is known from German Patent document DE 29 25 216 C2, in which device the rotor of the stepping motor can also be adjusted by the application of an external force or moment.

A control circuit for a stepping motor is known from German Patent document DE 29 08 182 C2, in which the provision is made that operation in the run mode and operation in the stop mode are implemented via an inhibit signal. Photoelectric transducers are used for position recognition. The goal of this reference is to be able to adjust the rotor of the stepping motor manually as well in the positions that occur during operation.

The alternative use of a digital angle sensor in a device for monitored control of a stepping motor is known from German Patent document DE 28 05 363 C2. It is known from WO 91/07811 to derive angle information from the control signals of a stepping motor.

U.S. Pat. No. 5,194,787 describes a circuit for a brushless DC motor with a plurality of fixed drive windings connected in a ring. The windings are energized periodically by a ring counter triggered by a monostable flip-flop circuit, with driver stages connected on the load side. Diagonal voltages from the winding ring are compared with one another by comparators to produce the signal that triggers the monostable flip-flop circuit on the supply side.

German Patent document DE-AS 1 303 612 describes a monitoring device for a pulse-controlled stepping motor having a plurality of stator windings and a permanent magnet as the rotor, and receiving signals from a control circuit without using brushes. The circuit distributes input pulses to the stator windings. Each device performs monitoring to determine that each pulse that reaches the control circuit acts on the motor, i.e. actually causes an incrementation or decrementation of the rotational position of the rotor. Optical sensing devices are used for this purpose.

The publication "Closed-Loop Control of a 3.6' Floppy-Disk Drive PM Motor by Back-EF Sensing," by B. C. Kuo, Department of Electrical Engineering, University of Illinois at Champaign-Urbana, and K. Butts, General Motors Corporation, Warren, Mich. describes a regulating device to improve starting behavior, rpm control, and rpm stabilization of a pulse-controlled motor of a floppy-disk drive, in which the voltages induced in the drive windings are evaluated as a function of the position and rpm of the rotor to control it within a closed regulating loop. As a result, optical devices can be eliminated.

The goal of the invention is to propose a device for driving a positioning element via a stepping motor. The device firstly permits electrical operating control of the stepping motor and secondly, when the rotor of the stepping motor is turned nonelectrically, especially manually, always provides information about the position reached in this fashion as the starting position for subsequent electrical control.

This goal is achieved in a device for driving a positioning element via a stepping motor whose rotor is rotationally and/or frictionally connected with the positioning element. The positioning element, including the rotor, is adjustable, even without electrical control of the stepping motor, by the action of an external force or moment. A control circuit generates driving pulses for the motor windings. The rotor is a permanent magnet rotor and the stepping motor has at least two drive windings. The control circuit, in addition to the outputs for controlling the motor windings, has at least two inputs for receiving at least two position signals and another output to output an inhibit signal. The device has stepping driver stages controlled by the outputs to the control motor windings, from the outputs of which stepping driver stages the at least two drive windings can be subjected to stepping pulses. Each of the stepping driver stages has a separate input for receiving inhibit signals. Each of these inputs is connected with the additional output of the control circuit. Each stepping driver stage is also made such that it disconnects a winding terminal controlled on the output side when it receives an inhibit signal. Each two terminals of the two windings of the stepping motor are effectively connected with the two inputs of at least two differential amplifiers designed with a specific hysteresis of their input/output behavior. Output signals of the amplifiers are supplied as actual setting signals to the at least two inputs of the control circuit.

The proposed device for driving a positioning element via a stepping motor, apart from the stepping motor itself, comprises a control circuit that generates drive pulses for the stepping motor. The rotor of the motor is connected by rotation and/or friction with a positioning element, so that the latter together with the rotor, even without electrical control of the stepping motor, can be adjusted by applying an external force or moment. According to the invention, the stepping motor has at least two drive windings and the rotor of the stepping motor is a permanent magnet. The control circuit has at least two inputs for receiving at least two position signals and one output for delivering an inhibit signal, as well as step driver stages from whose outputs the at least two drive windings can be energized by stepping pulses.

The step driver stages each have one separate input for receiving the above-mentioned inhibit signal and are designed so that when they receive an inhibit signal they disconnect the winding connection controlled on the output side with a high resistance. Each two connections of the at least two windings, independent of one another, of the stepping motor are effectively connected with the two inputs of at least two differential amplifiers, which are designed with a definite hysteresis for the input/output behavior. The output signals of these amplifiers are processed as actual position signals and are fed back for this purpose to the control circuit.

This device has the advantage that the stepping motor acts as an encoder in the state when it is not electrically controlled. The motor, in conjunction with the control circuit, continuously updates the position of the positioning element regardless of how it was reached.

In addition, with this device according to the invention, position changes and adjustments of an element that is adjustably connected by friction with the stepping motor, such as a damper, can be detected. With suitable programming of the control circuit that generates the driving pulses for the windings, a situation can be created in which, after the damper has moved into a specific position and is then adjusted by the action of an external force, the control circuit can return the damper to its set position after the disturbing force is eliminated. If the disturbance is prolonged, however, it can be detected at any time and the effect of the disturbing influence can be minimized, possibly by position regulation through adjustment of other regulating values.

Another advantage of the invention that can be utilized is that the stepping motor of the device, when operated as an encoder, renders mechanical indexing superfluous for an adjustable operating element since the magnetic field of the stepping motor produces a desirable indexing moment in any event. As a result, the low wear of such a drive can be maximized in a simple fashion. The mechanical indexing otherwise is subject to wear.

In an advantageous embodiment, the present invention can advantageously be operated even in conjunction with an operating or positioning element in a motor vehicle and operated in this connection particularly in combination with an operating element of a heating or air conditioning system.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic circuit diagram of the device according to the invention;

FIG. 1a is a sample schematic diagram of the complete operating circuit of the driver end stage 15A which can also represent the other driver end stages 15B to 15D in FIG. 1; and FIG. 2 is a schematic graph of various voltages at nodes A to F and INH as a function of time in the device according to FIG. 1.

DETAILED DESCRIPTION OF THE DRAWINGS

According to FIG. 1, a multiphase stepping motor 10 is positively coupled rotationally with a positioning element 11, made for example as an operating handle. This coupling can be provided, for example, by a shaft or by a complex mechanical system that ensures that when positioning element 11 is operated manually, the rotor of stepping motor 10 always turns with it in a state in which it is not under electrical control.

Stepping motor 10 has at least two windings 10.1 and 10.2 and at least four winding terminals A, B, C and D. The windings can be insulated from one another or can all be connected electrically to one another, for example at center taps. Such a connection is shown shaded and marked 24. A fifth connection of this kind would be necessary for example when the motor is to be controlled unipolarly with four phases, an arrangement which the invention includes in any event. Terminal 24 could then, depending on the control of driver end stages 15A to 15D, be connected either with a ground connection 25 thereof or with its supply bus 26, as will be described below in greater detail with reference to FIG. 1A.

For logical control of motor 10, the device comprises a special motor control circuit 12. The special motor control circuit 12 can be in the form of an application-specific circuit -for example, or in the form of a microcomputer, especially a microcontroller. It is connected supplywise between a ground potential 22' and a supply bus 26'. It also has at least five outputs $13_a$ to $13_d$ and $13_i$ (INH) and two inputs 23.1 and 23.2. Output $13_a$ is connected to winding terminal A, output $13_b$ is connected to winding terminal B, output $13_c$ is connected to winding terminal C, and output $13_d$ is connected to winding terminal D of stepping motor 10.

These control outputs 13a–13d are supplied to corresponding inputs of corresponding driver end stages 15A, 15B, 15C, 15D, whose outputs $15_a$ to $15_d$ are connected by leads 16a to 16d with winding terminals A to D of stepping motor 10. Driver end stages 15A, 15B, 15C and 15D also each have one inhibit input 15a, 15b, 15c, 15d, which are connected with output $13_i$ of motor control circuit 12 and are therefore simultaneously controllable.

Winding terminals A and B are connected by corresponding resistors 17a and 17b with the inverting or noninverting inputs of a first operational amplifier 18.1. The two amplifier inputs mentioned above are each connected through corresponding resistors 19a and 19b with ground reference potential 22 of amplifier 18.1. Preferably they can still be coupled together by a case capacitance 20.1.

Winding terminals C and D are connected by corresponding resistors 17c and 17d with the inverting or noninverting input of a second operational amplifier 18.2. The two amplifier inputs mentioned above are connected by corresponding resistors 19c and 19d with ground reference potential 22 of amplifier 18.2. Preferably they can also be coupled together by a case capacitance 20.2.

The ground potentials of the two amplifiers 18.1 and 18.2 must then, as a rule, be viewed as identical, since the amplifiers including the circuitry can in fact be mounted in a very small space, within which only disappearing small ground potential drops occur; therefore they are all marked as 22. Depending on whether inputs 23.1 are analog or digital, ground potential 22' of control circuit 12 and the above-mentioned ground potential 22 can be identical to one another, or small voltage differences can be permitted between them.

The noninverting inputs of each of the two above-mentioned amplifiers 18.1 and 18.2 are connected by resistors 21.1 and 21.2 with corresponding amplifier outputs F and E. Outputs F and E in turn are each connected with corresponding inputs 23.1 and 23.2 of the motor control circuit 12.

For the sake of completeness, FIG. 1a shows the entire operating circuit of driver end stages 15A to 15B. According to this figure, during bipolar two-phase operation of stepping motor 10, the individual driver end stages are connected as a rule to a common ground 25 and a supply bus 26, here assumed to be positive for example. So long as the motor control circuit 12 is appropriately supplied from a supply bus 26', which has the same potential as supply bus 26, during unipolar four-phase operation of the stepping motor as indicated by the dashed lines, under certain conditions the driver end stages can be connected either only with ground 25 or only with supply bus 26, depending on whether winding star point 24, i.e., the center tap, is then connected with the latter or with ground 25.

Of course, it goes without saying that here also a measure known of itself can be implemented, namely potential 24, to which the windings can be connected when electrically connected to one another, can be separated as a "power ground" from potential 22 that represents the "measuring ground." Then, there is no falsification of the signal voltages to be evaluated during exposure of motor 10 to pulses, nor are there any induction loops in which harmful disturbing voltages with a blocking effect are induced as a result of stray high-frequency fields like those created for example by cellular phones in vehicles in recent times.

The circuit described above for amplifier 18.1 and 18.2 produces a certain amount of hysteresis, with considerable suppression of the common-mode signals applied to the input side. Amplifiers 15A to 15D are made such that their output impedances jump from the relatively low value required for operational control of the motor to a very high value, comparable to the tristate output characteristic known from logical CMOS circuits (this applies equally to the voltage or current outputs of the -amplifier) as a result of a corresponding control signal at their inhibit inputs $15_a$ to $15_d$.

The function produced by these properties is shown in the graph in FIG. 2.

In this graph, voltages $U_a$ to $U_d$ which can be tapped off winding terminals A to D are plotted above voltages $U_e$ and $U_f$ that can be tapped off outputs F and E of operational amplifiers 18.1 and 18.2, namely for three different linked time phases I, II, and III.

In Phase I, amplifiers 15A to 15D are controlled by output $13_i$ of control circuit 12, for example with the logical level $U_{INH}$=Low, so that their outputs are connected to the windings with impressed winding voltages $U_a$ to $U_d$; similarly, as mentioned above, the windings could also be supplied with impressed currents.

Beginning at Phase II, the logical level output at output $13_i$ of control circuit 12 has changed to $U_{INH}$=High. The inhibit function triggered as a result no longer allows the control signals at outputs $13_a$ to $13_d$ to reach outputs $15_a$ to $15_d$ of amplifier 15A to 15B, and disconnects the winding terminals A to D.

This function can be provided to suppress the control of motor 10, against a stop during initialization, for example. Control cannot be completed following output of a number of pulses determined in advance, since during such operation control circuit 12 is still looking for the stop position from which defined positions can be reached with correspondingly counted step pulses.

The graph is based on the fact that the rotor of motor 10 has assumed a stable resting position in Phase II, i.e. it has not yet been brought by external moments into rotational motion; accordingly, voltages $U_A$ to $U_D$ at its winding terminals A to D have fallen to zero.

It is clear that on the basis of the hysteresis circuit of amplifiers 18.1 and 18.2, voltages $U_E$ and $U_F$ are present at outputs E and F when the windings are disconnected (i.e. at the end of Phase I). They do not change, so that the last logical state reached remains permanently set at inputs 23.1 and 23.2 of control circuit 12.

In Phase III, the logical level of the inhibit signal at inputs $15_a$ to $15_d$ continues to be $U_{INH}$=High, so that winding terminals A to D remain disconnected.

The rotor of stepping motor 10, however, is moved by a moment introduced externally, for example as the result of a manual adjustment. As a result of this movement, the analog voltage curves $U_a$ to $U_d$ shown in Phase III are generated in the millivolt range at terminals A to D.

Therefore, as soon as the voltage levels induced by outside action reach a value such that the hysteresis thresholds on amplifiers 18.1 and 18.2 are overcome, the logic levels previously maintained at their outputs jump to the respective complementary logic levels.

With manual rotation for example, voltage curves $U_E$ and $U_F$ are obtained as a result at the outputs E and F of the two differential amplifiers 18.1 and 18.2 in Phase III, always starting from the last voltage levels and are therefore stored.

This means that stepping motor 10 acts as an encoder in conjunction with the elements described. The motor provides information about its starting to move and the rotational speed, rotation direction, and range position currently reached, even without electrical control via the voltage curves $U_E$ and $U_F$.

It is important only that the operating handle, or an element to be adjusted thereby as well as by the motor 10, be connected rotationally and frictionally with the motor, since a slipping or sliding connection would lead to a loss of information.

Thus, in the course of performing a maneuver by which a normally electrically controlled adjustment of some element is to be, or is in fact, manually executed, communication takes place between the operator and the electronic control. Motor control circuit 12, by counting the logical level changes of $U_E$ and $U_F$ and discriminating the time sequence of these changes with respect to one another, is able to detect the new position into which the element or the rotor of the motor connected therewith-even after any number of revolutions—has been brought manually without electrical control, manually for example.

Motor control circuit 12 always contains information on the current starting position from which the rotor or the frictionally and/or rotatably connected element must be shifted or turned electrically, regardless of whether the last position was reached electrically or manually, and without a special rotational position sensor being required for that purpose.

From this, it is readily apparent that by virtue of this mode of operation of the stepping motor as an encoder, the position changes and adjustments of an element connected by an adjusting force with the stepping motor, for example an air duct damper, under outside influences can be detected.

With suitable programming of the motor control that generates driving pulses for the windings, a situation can be created such that when the damper has been brought into a certain position and then adjusted by the action of external forces, the motor control circuit can drive and move the damper back into its required position after the disturbing force has been eliminated. If the disturbance continues, however, this remains equally unrecognized and the effect of the disturbing influence can be minimized by position regulation involving adaptation of other regulating values.

It is important that stepping motor 10, during operation as an encoder, renders mechanical indexing superfluous for the adjustable operating handle, said indexing being subject to wear, as the magnetic field of the stepping motor provides a desired indexing moment in any event. In this way, the lack of wear in a corresponding drive can be maximized very simply.

Capacitors 20.1 and 20.2 shown in FIG. 1, which short-circuit the inputs of amplifiers 18.1 and 18.2 for highly frequent and rapid changes in the input parameters, produce a damping or filtering of noise spikes penetrating for example from the environment of the vehicle on-board electrical system, especially when manual rotation begins, while the voltages induced in the windings of the stepping motor are still relatively small relative to the possible noise voltages and are still growing. Hence this measure avoids information being lost as a result of radiated noise. It also protects against direct high-frequency radiation from cellular phones, for example affecting operational amplifiers 18.1 and 18.2. Capacitive short-circuiting of such signals on the input side prevents output signal shifts as a result of offset shifts resulting from internal rectifier effects in operational amplifiers 18.1 and 18.2 exposed to high-frequency electromagnetic radiation.

In this connection, it has been shown to be advantageous that inputs 23.1 and 23.2 can economically be made in the form of digital inputs. In this case, a voltage differential between potentials 22 and 22' that is within limits does not cause any problems. With longer distances between driver end stages 15A to 15D and stepping motor 10, this makes it possible to locate amplifier 18.1 and 18.2, together with the circuitry, in stepping motor 10 in order to reduce noise. Then, over a long distance, it is not the (very small) analog voltages $U_A$ to $U_D$ according to Phase III in FIG. 2 but the much more noise-resistant digital voltages $U_E$ and $U_F$, easy to filter at inputs 23.1 and 23.2, that are fed back from stepping motor 10 to control 12. This allows an improvement such that amplifiers 18.1 and 18.2 including resistors 17a to 17d, 19a to 19d, and 21.1 and 21.2 are enclosed inside a metal cover or housing of the stepping motor. With certain assumptions, the resistance to HF radiation can be maximized.

The invention includes as an improvement the fact that, except for the stepping motor, both control circuit 12 and stepping driver stages 15A to 15D as well as differential amplifiers with hysteresis 18.1 and 18.2, including their connections with one another, are made in the form of a monolithic integrated circuit.

The invention also includes as an improvement the use of any winding configuration of the stepping motor. In other words, even windings that consist of more than two partial windings that can be insulated from one another or for example can be grounded by tapping. Accordingly it is not limited to a specific number of stepper drivers.

The invention also includes as an improvement, a design of the device for adjusting a positioning element in a vehicle and in this regard, especially for adjusting an operating element of the heating or air conditioning system that is normally operable manually as well.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for driving a positioning element via a stepping motor having a rotor which is at least one of rotationally and frictionally connected with the positioning element, said positioning element and rotor being adjustable even without electrical control of the stepping motor by an external force or moment action, the device comprising:

a control circuit generating driving pulses as controlling motor winding outputs, the control circuit having at least two inputs for receiving at least two position signals and another output for outputting an inhibit signal;

wherein the rotor is a permanent magnet rotor and the stepping motor has at least two drive windings;

stepping driver stages controlled by the controlling motor winding outputs from the control circuit, said stepping driver stages providing outputs which subject the at least two drive windings to stepping pulses;

wherein each of the stepping driver stages has a separate input for receiving the inhibit signal from the control circuit;

each of the stepping driver stages being made such that it disconnects a winding terminal controlled on an output side of the respective stepping driver stage when it receives the inhibit signal;

wherein each two terminals of the at least two windings of the stepping motor are effectively connected with the two inputs of at least two differential amplifiers designed with a specific hysteresis; and wherein output signals of the at least two differential amplifiers are supplied as actual setting signals to the at least two inputs of the control circuit.

2. The device according to claim 1, wherein the control circuit, the stepping driver stages, and the differential amplifiers with hysteresis, together with their connections with one another, are made in a monolithic integrated circuit.

3. The device according to claim 1, further comprising filter capacitors connected in parallel with the two inputs of the two differential amplifiers.

4. The device according to claim 1, wherein the at least two drive windings are electrically isolated from one another.

5. The device according to claim 1, wherein the at least two drive windings are electrically coupled with one another.

6. The device according to claim 5, wherein an electrical connecting point of the at least two drive windings is connected with one of two potentials of a power supply for the stepping motor, the stepping driver stages each being connected at least with an opposite one of the two potentials.

7. The device according to claim 5, wherein an electrical connecting point of the at least two drive windings is connected to a potential which, apart from an unavoidable voltage drop which is small in comparison with a supply voltage, coincides with a potential with respect to which an evaluation of the voltages induced in the at least two drive windings is performed.

8. The device according to claim 1, wherein the two differential amplifiers are in the form of resistance-coupled operational amplifiers, whose inputs are each connected through first resistors with the winding terminals and through second resistors with a reference potential.

9. The device according to claim 1, wherein said device is provided in a vehicle in conjunction with one of an operating and adjusting element.

10. The device according to claim 9, wherein the positioning element is the operating element of one of a heating and air conditioning system of the vehicle.

11. The device according to claim 1, wherein said device is operated as a position-regulating circuit within which the control circuit, following adjustment of the stepping motor via outside forces, delivers at least temporarily correcting driving pulses because of one of a force and moment causing the stepping motor to return to a rotor position that existed prior to the adjustment by the outside forces once a cause producing the outside forces disappears.

12. The device according to claim 1, wherein a magnetic resistance moment during a manual rotation of the stepping motor not operated electrically is utilized as an indexing device to prevent inadvertent or neutral adjustability of an operating handle connected with the rotor of the stepping motor.

13. The device according to claim 1, wherein the differential amplifiers are located one of on and in the stepping motor.

* * * * *